: US009764652B2

United States Patent
Pounds

(10) Patent No.: US 9,764,652 B2
(45) Date of Patent: *Sep. 19, 2017

(54) APPARATUS FOR REPLENISHING A VEHICLE ENERGY SOURCE

(71) Applicant: Olaeris, Inc, Fort Worth, TX (US)

(72) Inventor: Paul E. I. Pounds, Brisbane (AU)

(73) Assignee: Olaeris, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,829

(22) Filed: Feb. 21, 2017

(65) Prior Publication Data
US 2017/0203663 A1    Jul. 20, 2017

Related U.S. Application Data

(63) Continuation of application No. 14/481,428, filed on Sep. 9, 2014, now Pat. No. 9,577,445.
(Continued)

(51) Int. Cl.
*H02J 7/00* (2006.01)
*B60L 11/18* (2006.01)
*B67D 7/04* (2010.01)

(52) U.S. Cl.
CPC ........ *B60L 11/1818* (2013.01); *B67D 7/0401* (2013.01); *H02J 7/0029* (2013.01);
(Continued)

(58) Field of Classification Search
CPC ............ H02J 2007/0039; H02J 7/0029; H02J 7/0042; H02J 7/0044; H02J 7/0045;
(Continued)

(56) References Cited

U.S. PATENT DOCUMENTS 2,939,657 A    6/1960   Westcott, Jr.
4,123,020 A   10/1978   Korsak
(Continued)

FOREIGN PATENT DOCUMENTS

WO    2013055265 A1    4/2013

OTHER PUBLICATIONS

"Non-Final Office Action Issued in U.S. Appl. No. 14/481,428", dated Aug. 16, 2016, 10 Pages.
"Notice of Allowance Issued in U.S. Appl. No. 14/481,428", dated Dec. 30, 2017, 18 Pages.
"Non-Final Office Action Issued in U.S. Appl. No. 14/670,913", dated Apr. 14, 2017, 14 Pages.

*Primary Examiner* — Nathaniel Pelton
(74) *Attorney, Agent, or Firm* — Dodd Law Group, LLC; Michael B. Dodd

(57) ABSTRACT

The present invention extends to methods, systems, devices, and apparatus for replenishing vehicle resources. Vehicles can be aligned with and docked to replenishment devices. In one aspect, a flying vehicle (e.g., an unmanned aerial vehicle (UAV)) is aligned onto electrical recharging contacts. The flying vehicles fuel level or battery charge can be replenished with minimal, if any, human intervention. Vehicle docking (e.g., landing), alignment, and replenishment can be performed automatically. A circular ring or shaped surface of a vehicle can engage with a conical sloping surface of a docking apparatus as a vehicle moves towards and/or into the docking apparatus. The conical sloping surface shape aligns the vehicle with recharge contacts or a refueling probe at the base of the docking apparatus.

20 Claims, 3 Drawing Sheets

Related U.S. Application Data

(60) Provisional application No. 61/875,685, filed on Sep. 9, 2013, provisional application No. 61/876,291, filed on Sep. 11, 2013.

(52) U.S. Cl.
CPC ......... *H02J 7/0042* (2013.01); *B60L 2200/10* (2013.01); *B60L 2200/32* (2013.01); *B67D 2007/0455* (2013.01)

(58) Field of Classification Search
CPC .............. B60L 11/1818; B60L 11/1827; B60L 11/1833; B60L 2200/10; Y02T 90/125
USPC ......................................................... 320/109
See application file for complete search history.

(56) References Cited

U.S. PATENT DOCUMENTS

| | | |
|---|---|---|
| 4,236,686 A | 12/1980 | Barthelme et al. |
| 4,523,729 A | 6/1985 | Frick |
| 8,172,177 B2 | 5/2012 | Lovell et al. |
| 8,453,966 B2 | 6/2013 | McGeer et al. |
| 9,434,481 B2 | 9/2016 | McGeer |
| 9,505,493 B2 | 11/2016 | Borko |
| 2006/0249622 A1 | 11/2006 | Steele |
| 2012/0271491 A1* | 10/2012 | Spata ...................... G01W 1/00 701/3 |
| 2013/0187599 A1 | 7/2013 | Ranga et al. |
| 2014/0232337 A1* | 8/2014 | Namou ................. H02J 7/0027 320/109 |

* cited by examiner

APPARATUS FOR REPLENISHING A VEHICLE ENERGY SOURCE

CROSS-REFERENCE TO RELATED APPLICATIONS

This application is a continuation of and claims the benefit of and priority to U.S. patent application Ser. No. 14/481,428, entitled "Vehicle Replenishment", filed Sep. 9, 2014 by Paul E. I. Pounds, the entire contents of which are expressly incorporated by reference. That application claims the benefit of and priority to U.S. Provisional Patent Application Ser. No. 61/875,685 entitled "Landing Site Replenishment For Unmanned Aerial Vehicles", filed Sep. 9, 2013 by Paul E. I. Pounds, the entire contents of which are expressly incorporated by reference. That application claims the benefit of and priority to U.S. Provisional Patent Application Ser. No. 61/876,291 entitled "Landing Site Replenishment For Unmanned Aerial Vehicles", filed Sep. 11, 2013 by Paul E. I. Pounds, the entire contents of which are expressly incorporated by reference.

BACKGROUND

1. Background and Relevant Art

Refueling or recharging of vehicles by automatic means is carried out by bringing the vehicle into positive contact with a supply station. Achieving positive contact includes using precision guidance to bring a vehicle onto charging contacts, into a refueling drogue, adjacent to a recharge pad, and so on. Precision guidance mechanisms typically require manual guidance or feedback control of trajectory, such as, by using visual markers or some other sensing modality.

A variety of active alignment methods, such as, spacecraft docking adaptors, also rely on accurate orientation alignment prior to engagement. Orientation or position errors may result in the rejection or ejection of the spacecraft in a docking attempt.

BRIEF SUMMARY

The present invention extends to methods, systems, devices, and apparatus for replenishing vehicle resources. In one aspect, a docking apparatus is configured to align an incoming vehicle, for example, an unmanned aerial vehicle (UAV), with a system for replenishing its power source. Docking (e.g., landing), alignment, and replenishment can be performed automatically.

In one aspect, a vehicle is aligned on a receptacle (e.g., a supply station receptacle) for power replenishment. A structure on the vehicle, for example, underneath a hovering aircraft, engages with a sloped surface. The sloped surface directs the vehicle to align with the center of the receptacle as the vehicle moves toward the receptacle (e.g., as it descends).

Automatic refueling or recharging of the vehicle is carried out by bringing the vehicle into positive contact with the supply station, such as, for example, bringing the vehicle onto charging contacts, into a refueling drogue, adjacent to a recharge pad, and so on. Automated or manual guidance systems can be used to control vehicle trajectory. Visual markers, radio, radar, or some other sensing modality that provides position information may be used for spatial orientation. Other approaches may employ external devices to actively move the vehicle into alignment during or after docking (e.g., landing) in an approximate position, such as spacecraft docking adaptors.

In one aspect, a conical sloped surface that directs a hovering rotorcraft down onto electrical recharging contacts.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, devices, and apparatus for replenishing vehicle resources. Vehicles can be aligned with and docked to replenishment devices. In one aspect, a flying vehicle (e.g., an unmanned aerial vehicle (UAV)) is aligned onto electrical recharging contacts. The flying vehicles fuel level or battery charge can be replenished with minimal, if any, human intervention.

Figure 1A:
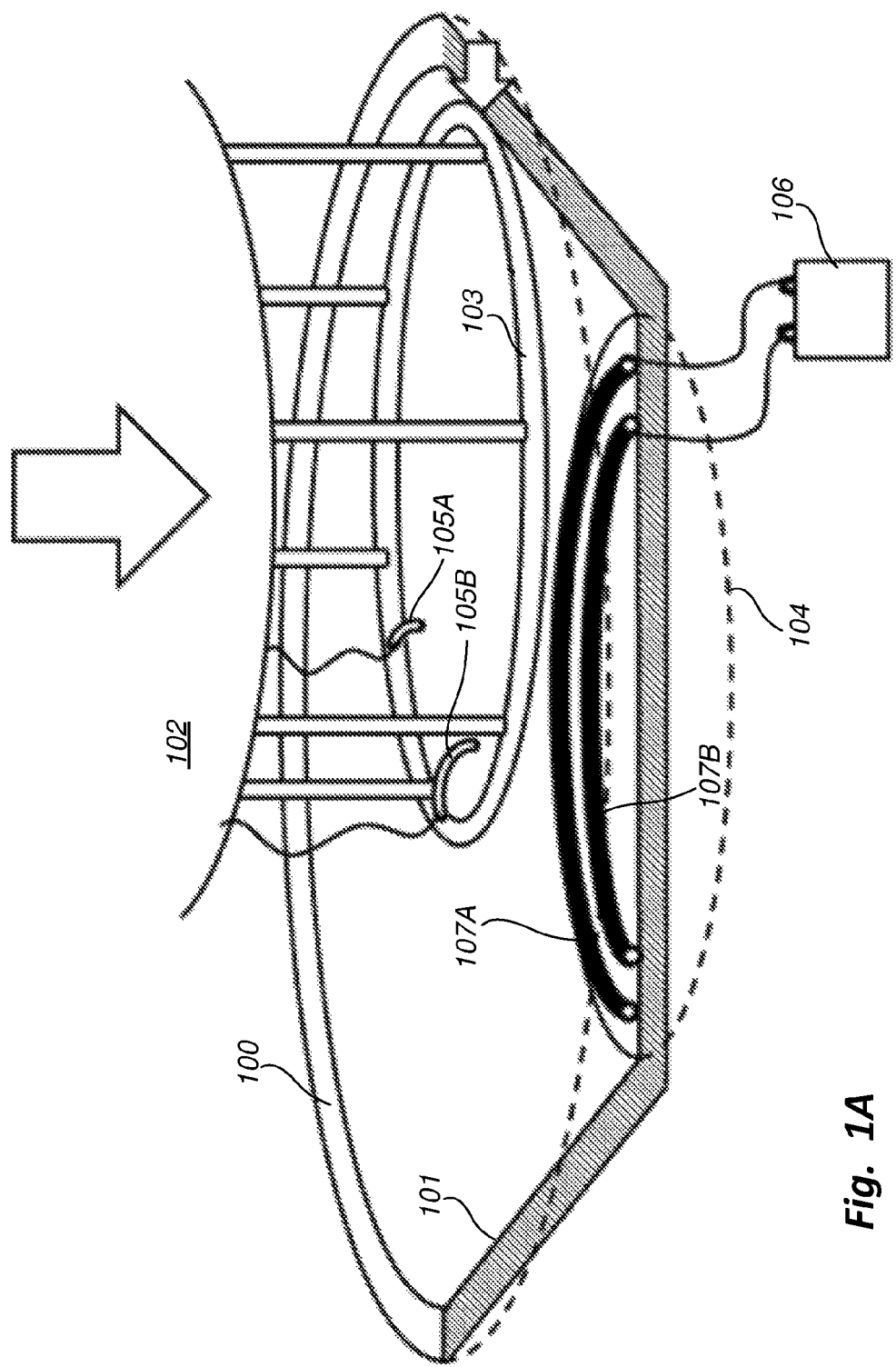
FIG. 1A illustrates a perspective view of a landing apparatus relative to a vehicle structure.

FIG. 1A illustrates a perspective view of a docking apparatus 100 (e.g., a landing pad) relative to a vehicle structure 102. Vehicle structure 102 can be part of a vehicle, such as, for example, a UAV. Vehicle structure 102 includes ringed landing adaptor 103 with corresponding contacts 105A and 105B. Contacts 105A and 105B can be connected to an onboard battery at the vehicle. Docking apparatus 100 has a conical alignment surface 101, circular (or other appropriate shape for a vehicle's fuselage) base 104, and contact rings 107A and 107B. Contact rings 107A and 107B are electrically connected to off board power source 106, such as, for example, a battery, a transformer, a grid connection, etc.

Ringed landing adaptor 103 can configured to approximate the size and shape of circular base 104.

Conical alignment surface 101 passively slides circular ring adaptor 103 (and thus the vehicle) into alignment with the center of circular base 104 as vehicle structure 102 moves towards circular base 104. For example, as a UAV descends onto docking apparatus 100, conical alignment surface 101 passively slides ringed landing adaptor 103 into alignment with circular base 104 as the UAV descends. Conical alignment surface 101 can be configured to align vehicle apparatus at virtually any angle. For example, in water, conical alignment surface 101 can be used to align a ringed landing adaptor on a submersible that is approaching in an essentially horizontal direction. In space, conical alignment surface 101 can be used to align a ringed landing adaptor on a space vehicle that is approaching at any of a variety of different angles.

The slope of the conical alignment surface 101 can vary. In one aspect, conical alignment surface 101 is a funnel with varying curvature. The curve or slope of conical alignment surface 101 can be configured such that the lateral force produced by the slope is sufficient to overcome contact friction between ringed landing adaptor 103 and conical alignment surface 101. Overcoming the contact friction allows ringed landing adaptor 103 to move towards the center of circular base 104. Ringed landing adaptor 103 can be fitted with wheels, skids, bearings or other components to minimize contact friction with conical alignment surface 101.

Figure 1B:
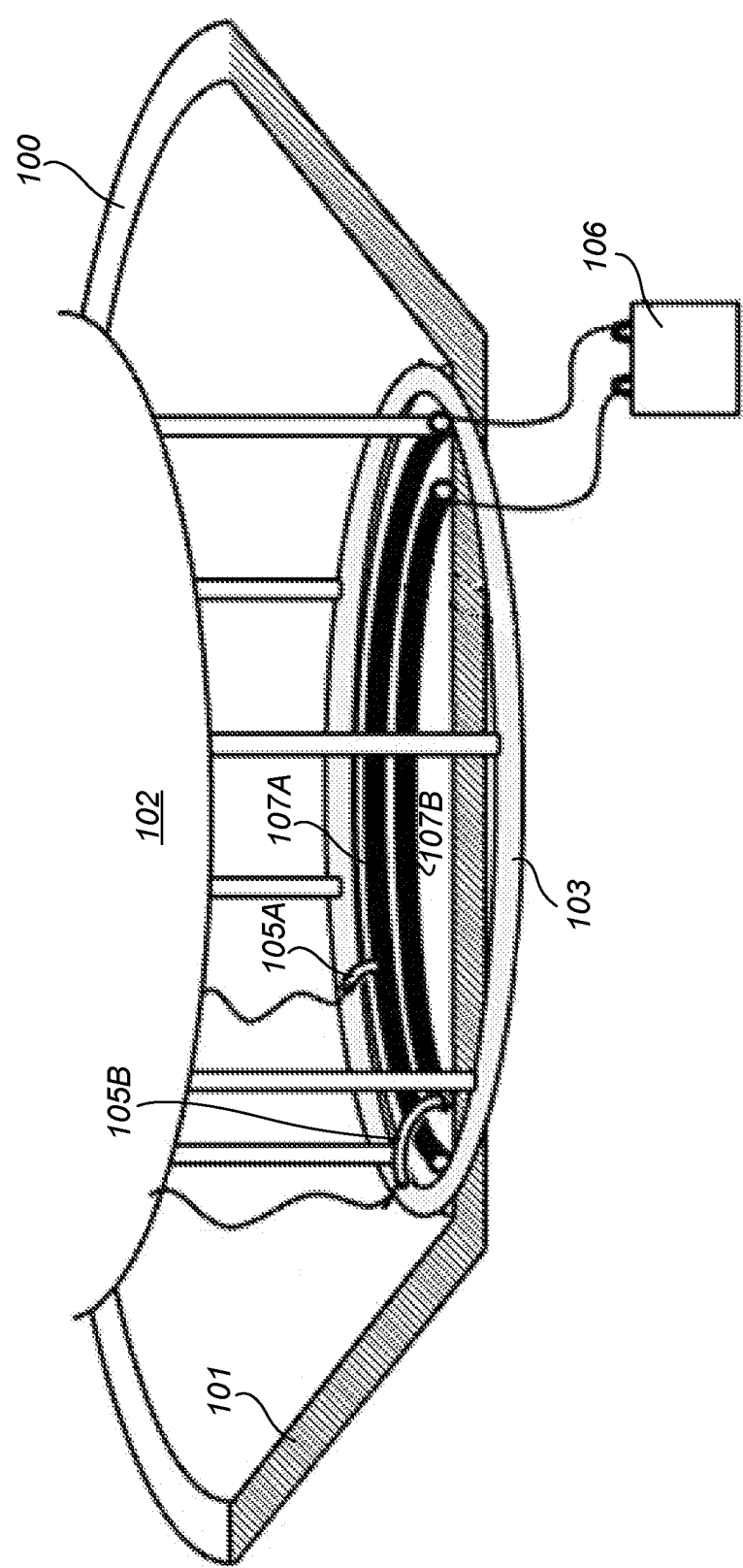
FIG. 1B illustrates perspective view of the vehicle structure aligned with replenishment contacts.

FIG. 1B illustrates perspective view of vehicle structure 102 aligned with contact rings 107. When aligned, contacts 105A and 105B can be in mechanical contact with corresponding contact rings 107A and 107B. Sensors can be used to detect when vehicle structure 102 is appropriately aligned. When alignment is detected, contact rings 107A and 107B can be energized from off board power source 106. When contact rings 107A and 107B are energized, corresponding contacts 105A and 105B can replenish an on board power source (e.g., a battery) with energy provided from off board power source 106.

In one aspect, replenishment devices are contained inside ringed landing adaptor 103. For electric replenishment, replenishment devices can include two concentric rings connected to recharge circuitry of a vehicle (e.g., a UAV), or directly to the battery terminals on a vehicle battery. At circular base of a landing apparatus, the rings can connect to the power source for recharging (mains supply, generator, battery or other source). The landing apparatus and vehicle (e.g., UAV) can each optionally include a protection circuitry to prevent shorting due to misalignment or other conditions.

In one aspect, circular base 104 includes a drainage system or grating to allow moisture to escape from docking apparatus 100.

Docking apparatus 100 can also include an environmental enclosure that opens and closes to prevent continuous exposure to the effects of weather and wind, including rain, humidity, snow, frost, precipitation and sand. A fan or conditioning unit may be used to control the internal environment of the enclosure, when enclosed.

The environmental enclosure can protect contact rings 107A and 107B when not in use or being made available to a docked or docking vehicle. The environmental enclosure can also include a shelter configured to protect a docked vehicle from weather conditions selected from the group including rain, humidity, snow, frost, precipitation and sand. The shelter can include one or more of a shutter, an aperture, and a housing. The shelter can be operable to enable a vehicle to disengage from docking apparatus 100 (e.g., a UAV to fly out substantially vertically) when open, and restrict the ingress of weather or contaminants when closed.

In another aspect, docking apparatus 100 includes appropriate components to facilitate maritime (underwater) use or space based use.

Docking apparatus 100 can include components for locking a vehicle in an aligned position during replenishment.

Figure 2:
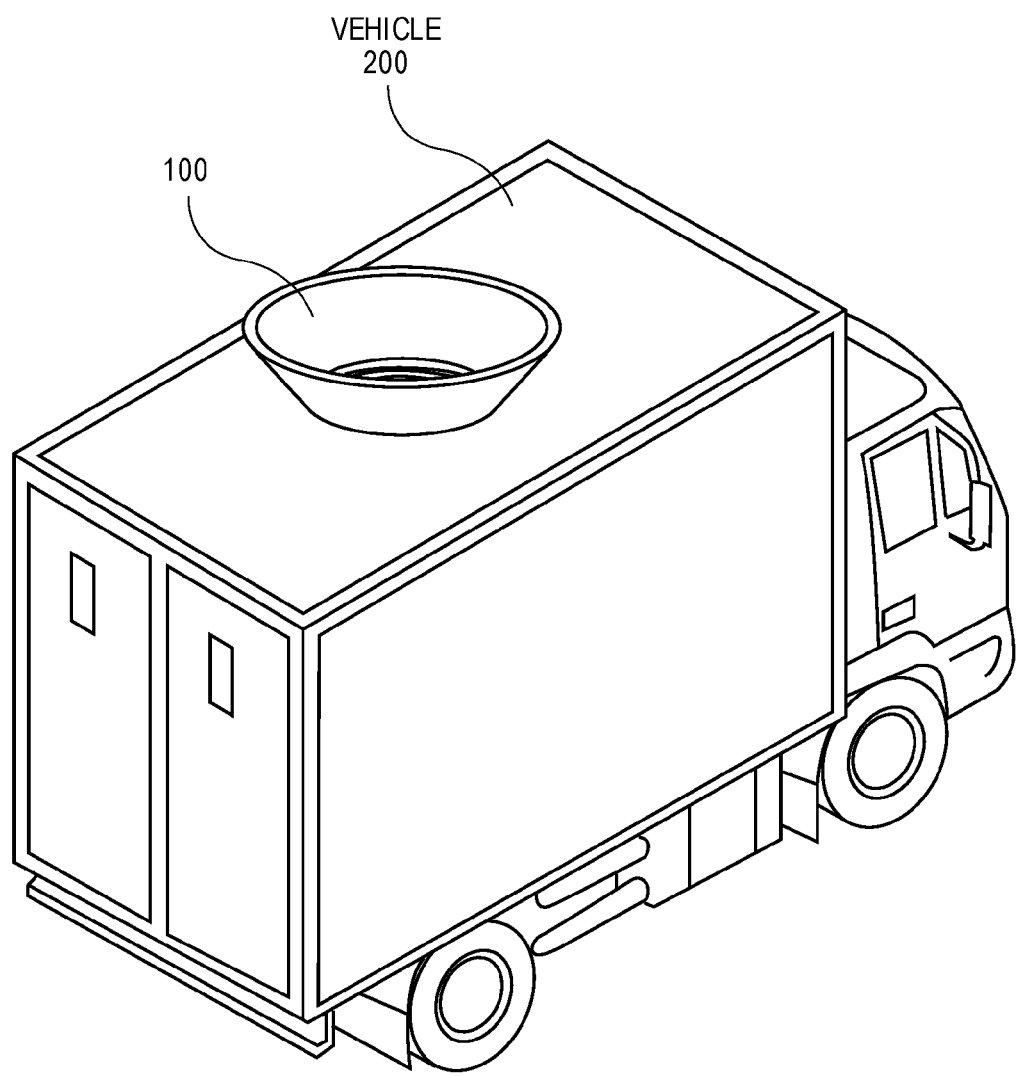
FIG. 2 illustrates an example of a docking apparatus mounted on a vehicle.

Docking apparatus 100 can be stationary or mobile and be land, sea, air or space based. In some embodiments, different portions of docking apparatus are mounted on different structures, such as, for example, on a vehicle and a fixed structure or on two vehicles. As such, multiple flying vehicles, ground based vehicles, maritime vehicles, or spaced based vehicles can engage with one another. One vehicle can then replenish resources from the other vehicle. When two vehicles are engaged, the two vehicles become a single joined unit—both during movement (e.g., in flight, on ground, underwater, in space, etc.) or when stationary. FIG. 2 illustrates an example of docking apparatus 100 mounted on a vehicle 200.

Any of a variety of different vehicles can dock with docking apparatus 100 to replenish resources. In one aspect, a rotary based UAV lands on docking apparatus 100 to replenish batteries or other fuel sources.

In one aspect, a refueling probe is located at the base of docking apparatus 100. Vehicles docking with docking apparatus 100 can have a corresponding refueling port. Conical alignment surface 101 can align the refueling port with the refueling probe. The refueling probe can be connected to a liquid fuel source. When a vehicle is docked, liquid fuel can be transferred (e.g., pumped) through the refueling probe into the refueling port to replenish the vehicle.

As such, automatic refueling or recharging of the vehicle is carried out by bringing the vehicle into positive contact with the supply station, such as, for example, bringing the vehicle onto charging contacts, into a refueling drogue, adjacent to a recharge pad, and so on. Automated or manual guidance systems can be used to control vehicle trajectory. Visual markers, radio, radar, or some other sensing modality that provides position information may be used for spatial orientation. Other approaches may employ external devices to actively move the vehicle into alignment during or after docking (e.g., landing) in an approximate position, such as spacecraft docking adaptors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A docking apparatus for docking a vehicle, the docking apparatus comprising:
   a base, the base including first and second base replenishment contacts configured for coupling to a corresponding first and second vehicle replenishment contacts on the vehicle, the first base replenishment contact comprising a ring of a first size, the second base replenishment contact comprising a ring of a second size, wherein the first size is larger than the second size; and
   wherein the docking apparatus is configured to engage a replenishment adaptor of the vehicle, the replenishment adaptor comprising a ring of a third size, the corresponding first and second vehicle replenishment contacts connected to the replenishment adaptor, the docking apparatus further configured to align the second vehicle replenishment contact extending around the first base replenishment contact for contact with the second base replenishment contact, wherein the third size is larger than the first size.

2. The docking apparatus of claim 1, wherein the base including first and second base replenishment contacts configured for coupling to a corresponding first and second vehicle replenishment contacts on the vehicle comprises the base include first and second base replenishment contacts configured for coupling to a first vehicle replenishment contact of a first length and to a curved second vehicle replenishment contact of a second length, the second length being longer than the first length.

3. The docking apparatus of claim 1, wherein the ring of a first size is a ring of a first diameter, wherein the ring of a second size is a ring of a second diameter, and wherein the first diameter is larger than the second diameter.

4. The docking apparatus of claim 3, wherein the ring of the third size comprises a ring of a third diameter, wherein the third diameter is larger than the first diameter.

5. The docking apparatus of claim 1, wherein the first and second base replenishment contacts are connected to a replenishment system for replenishing an energy resource used by the vehicle.

6. The docking apparatus of claim 5, wherein the first and second base replenishment contacts being connected to a replenishment system comprises the first and second base replenishment contacts being connected to an electrical recharging system.

7. The docking apparatus of claim 5, wherein the first and second base replenishment contacts being connected to a replenishment system comprises the first and second base replenishment contacts being connected to a liquid fuel source.

8. The docking apparatus of claim 1, wherein the docking apparatus is included as a component of a second vehicle.

9. The docking apparatus of claim 1, wherein the first and second base replenishment contacts configured for coupling to corresponding first and second vehicle replenishment contacts on the vehicle comprises the first and second base replenishment contacts configured for coupling to corresponding first and second vehicle replenishment contacts on one of: a space based vehicle, a maritime vehicle, or an unmanned aerial vehicle (UAV).

10. The docking apparatus of claim 1, further comprising a refueling probe, the refueling probe configured for connection to a corresponding refueling port of the vehicle, the refueling probe for transferring liquid fuel to the vehicle through the refueling port.

11. A vehicle replenishment system comprising:
a surface having an opening of a first size for receiving a replenishment adaptor of a vehicle, the surface sloping to a base of a second size, the replenishment adaptor having a third size, wherein the first size is larger than the second size and the second size is larger than the third size;
wherein the base includes a first charging contact and includes a second charging contact, the first and second charging contacts configured to engage with first and second vehicle contacts respectively on the replenishment adaptor, the first and second charging contacts connected to an energy resource such that the orientation of the vehicle does not impair the ability of the vehicle to replenish the energy resource, wherein the first charging contact is a fourth size and the second charging contact is a fifth size and wherein the third size is larger than both the fourth size and the fifth size.

12. The vehicle replenishment system of claim 11, further comprising a refueling probe, the refueling probe for transferring liquid fuel to the vehicle.

13. The vehicle replenishment system of claim 11, wherein the opening of a first size for receiving a replenishment adaptor of a vehicle comprises an opening of a first size for receiving a replenishment adaptor of one of: a space based vehicle, a maritime vehicle, or an unmanned aerial vehicle (UAV).

14. The vehicle replenishment system of claim 11, wherein vehicle replenishment system is included as a component of a second vehicle.

15. The vehicle replenishment system of claim 11, wherein the first and second charging contacts connected to an energy resource comprises the first and second charging contacts connected to a source of electricity.

16. A docking apparatus for docking an unmanned aerial vehicle (UAV) for electrical recharging, the docking apparatus comprising:
a base, the base including first and second base replenishment contacts configured for coupling to a corresponding first and second vehicle replenishment contacts on the unmanned aerial vehicle (UAV), the first and second base replenishment contacts connected to a source of electricity, the first base replenishment contact comprising a ring of a first size, the second base replenishment contact comprising a ring of a second size, wherein the first size is larger than the second size; and
wherein the docking apparatus is configured to engage a landing adaptor of the unmanned aerial vehicle (UAV), the landing adaptor comprising a ring of a third size, the corresponding first and second vehicle replenishment contacts connected to the landing adaptor, the docking apparatus further configured to align the first and second vehicle replenishment contacts for contact with the first and second base replenishment contacts respectively, wherein the third size is larger than the first size.

17. The docking apparatus of claim 16, wherein the ring of the first size comprises a ring of a first diameter, wherein the ring of the second size comprises a ring of a second diameter, and wherein the first diameter is larger than the second diameter.

18. The docking apparatus of claim 17, wherein a ring of a third size comprises a ring of a third diameter and wherein the third diameter is larger than the first diameter.

19. The docking apparatus of claim 16, wherein the ring of the first size comprises a ring of a first diameter, wherein the ring of the third size comprises a ring of a third diameter, and wherein the third diameter is larger than the first diameter.

20. The docking apparatus of claim 16, wherein the first and second base replenishment contacts connected to a source of electricity comprises the first and second base replenishment contacts connected to one or more of: a mains supply, a generator, or a battery.

* * * * *